(12) United States Patent
Prunier (10) Patent No.: US 11,163,782 B2
(45) Date of Patent: Nov. 2, 2021

(54) STORAGE OF TIME SERIES DATA USING DYNAMIC SCHEMA

(71) Applicant: EMC IP Holding Company LLC, Hopkinton, MA (US)

(72) Inventor: Dominique Prunier, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 16/813,911

(22) Filed: Mar. 10, 2020

(65) Prior Publication Data

US 2021/0286814 A1    Sep. 16, 2021

(51) Int. Cl.
| | | |
|---|---|---|
| *G06F 16/24* | (2019.01) | |
| *G06F 16/2458* | (2019.01) | |
| *G06F 16/21* | (2019.01) | |
| *G06F 21/62* | (2013.01) | |
| *G06F 16/22* | (2019.01) | |

(52) U.S. Cl.
CPC .......... *G06F 16/2474* (2019.01); *G06F 16/21* (2019.01); *G06F 16/22* (2019.01); *G06F 16/2477* (2019.01); *G06F 21/6218* (2013.01); *G06F 2221/0751* (2013.01)

(58) Field of Classification Search
CPC ....... G06F 16/13; G06F 16/2255; G06F 16/23
See application file for complete search history.

(56) References Cited

U.S. PATENT DOCUMENTS

| | | | | |
|---|---|---|---|---|
| 10,346,394 B2 * | 7/2019 | Caudy | .................. | G06F 16/278 |
| 2009/0187612 A1 * | 7/2009 | Kaijima | .................. | G06F 16/25 |
| 2013/0311444 A1 * | 11/2013 | Samwel | ............... | G06F 16/245 |
| | | | | 707/714 |

OTHER PUBLICATIONS

"GitHub—Faster XML/jackson: Main Portal page for the Jackson project", downloaded from https://github.com/FasterXML/jackson on Mar. 3, 2020.

\* cited by examiner

*Primary Examiner* — Baoquoc N To
(74) *Attorney, Agent, or Firm* — Ryan, Mason & Lewis, LLP (57) ABSTRACT

Techniques are provided for storing generic time series data using a dynamic schema. One method comprises receiving a request to store a data point into a time series, wherein the data point comprises a key-value pair; in response to the received request, (i) evaluating whether a current dynamic schema supports the data point, and (ii) updating the current dynamic schema to support the data point responsive to the current dynamic schema not supporting the data point, wherein the current dynamic schema supports a plurality of data types; encoding the data point using an encoding technique that depends on the data type of at least one key-value pair of the data point; and storing the data point in a time series storage buffer.

20 Claims, 7 Drawing Sheets

STORAGE OF TIME SERIES DATA USING DYNAMIC SCHEMA

FIELD

The field relates generally to information processing systems, and more particularly to a storage of time series data in such information processing systems.

BACKGROUND

In infrastructure monitoring applications, a generic time series database is often employed, where multiple services can store and retrieve arbitrary time series data. Due to the generic nature of such time series databases, time series data are usually defined using a flexible data structure.

When such time series are programmatically consumed (especially in a streaming fashion), a program cannot make many assumptions regarding the content of the time series. Rather, the program needs to employ flexible and dynamic data structures (e.g., extensible lists, maps and/or dictionaries) to support the generic nature of the data while maintaining reasonable performance. These dynamic structures tend to be memory inefficient, as they typically trade off performance at the expense of memory usage.

A need therefore exists for improved techniques for storing time series data.

SUMMARY

In one embodiment, a method comprises receiving a request to store a data point into a time series, wherein the data point comprises at least one key-value pair; in response to the received request, (i) evaluating whether a current dynamic schema supports the data point, and (ii) updating the current dynamic schema to support the data point responsive to the current dynamic schema not supporting the data point, wherein the current dynamic schema supports a plurality of data types; encoding the data point using an encoding technique that depends on the data type of at least one key-value pair of the data point; and storing the data point in at least one time series storage buffer.

In at least some embodiments, the at least one time series storage buffer comprises a first buffer that stores data point values for multiple data types, a second buffer that stores generic values of an object data type, a third buffer that stores a version of the current dynamic schema for each data point, and/or a fourth buffer that stores an offset position of a beginning of each data point in the first buffer.

In one or more embodiments, the encoded data point is decoded by (a) determining the version of the dynamic schema for the encoded data point by accessing the third buffer; (b) identifying a beginning of the encoded data in the first buffer by accessing the fourth buffer; (c) obtaining the encoded data point from the first buffer using the identified beginning; and (d) for each key of the current dynamic schema, decoding a corresponding value from the encoded data point from one of the first and second buffers based on the data type of the corresponding key in the current dynamic schema.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for storing generic time series data using a dynamic schema.

Figure 1:
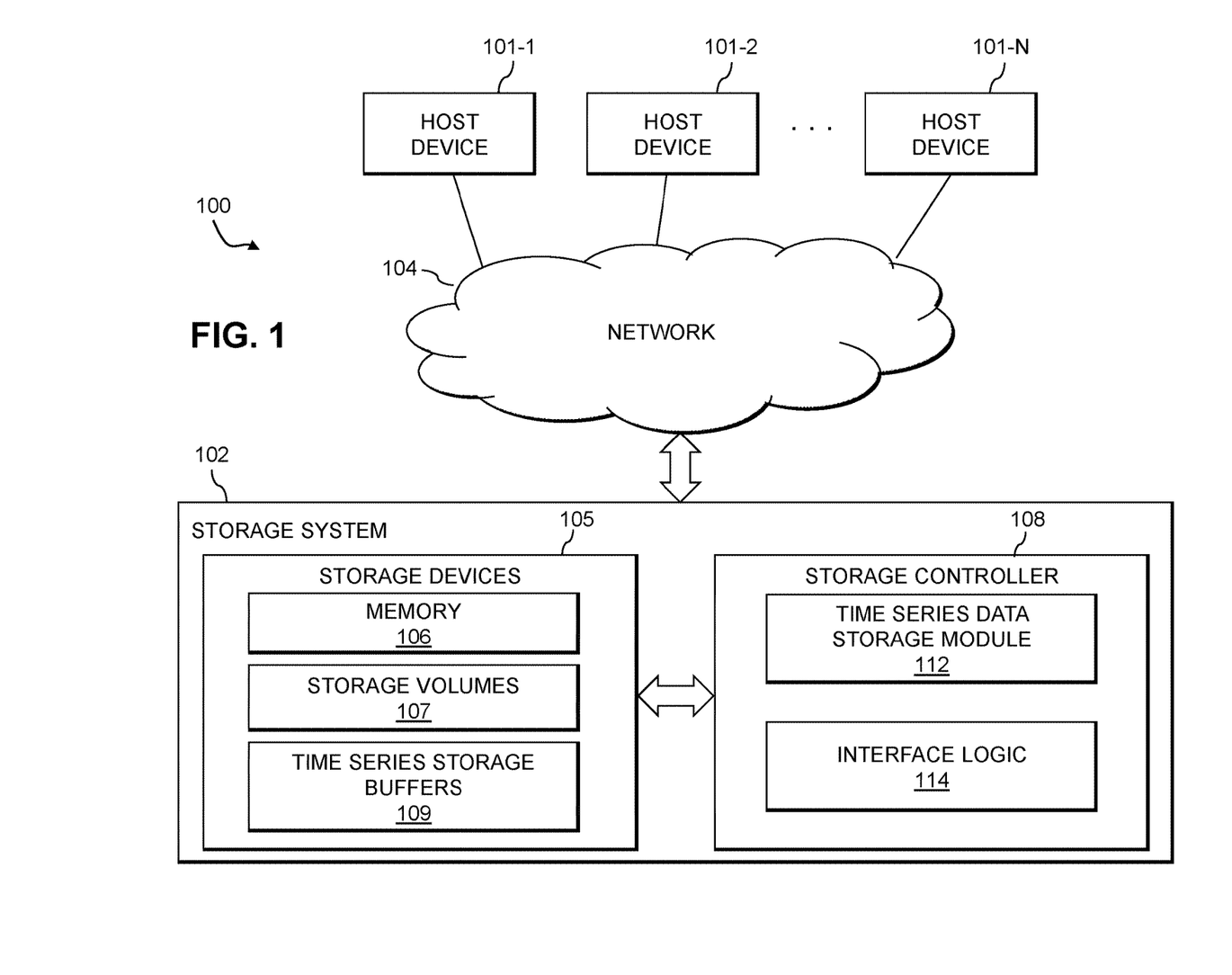
FIG. 1 shows an information processing system configured for storing generic time series data using a dynamic schema in an illustrative embodiment of the disclosure.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices, or a monitoring of a monitored environment and the collection of time series data from the monitored environment. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 105 and an associated storage controller 108. The storage devices 105 store data of a memory 106, a plurality of storage volumes 107 and/or time series storage buffers 109 (as discussed further below in conjunction with FIG. 2). The storage volumes 107 illustratively comprise respective logical units (LUNs) or other types of logical storage volumes. The term "storage volume" as used herein is intended to be broadly construed, and should not be viewed as being limited to any particular format or configuration.

The storage devices 105 of the storage system 102 illustratively comprise solid state drives (SSDs). Such SSDs are implemented using non-volatile memory (NVM) devices such as flash memory. Other types of NVM devices that can be used to implement at least a portion of the storage devices 105 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 105 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprise a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell EMC. Other types of MPIO drivers from other driver vendors may be used.

The storage controller 108 of storage system 102 in the FIG. 1 embodiment includes a time series data storage module 112 and interface logic 114. Functionality for storing generic time series data using a dynamic schema in the storage system 102 is illustratively performed at least in part by the storage controller 108, utilizing its time series data storage module 112, in a manner to be described in more detail elsewhere herein. The exemplary interface logic 114 enables the storage controller 108 to interface with one or more additional elements of the information processing system 100 of FIG. 1, in a known manner.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 105, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 8 and 9.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 105, memory 106, storage volumes 107, storage controller 108, time series storage buffers 109, and time series data storage module 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing time series data storage module 112 will be described in more detail with reference to the flow diagrams of FIGS. 6 and 7.

As noted above, due to the generic nature of a generic time series database, time series data are often defined as a flexible data structure comprising:

a time series identifier (e.g., one or more identifiers whose combination uniquely identifies the corresponding time series); and an arbitrarily long list of data points, with each of these data points comprising arbitrary, possibly changing, key-value pairs, including but not limited to, timestamps, integer values, floating point values, and textual values.

As used herein, the term "generic" indicates that the time series database is designed to apply to a number of different contexts (e.g., support storage of any key-value pairs). In addition, as used herein, the phrase "storing a data point into a time series" (or similar terms) shall encompass loading the data point in memory (e.g., for further processing), as well as storing the data point in longer term storage (e.g., storing the data point to disk storage), as would be apparent to a person of ordinary skill in the art.

For example, one representative time series can be defined as follows:

Identifier: (Server1, Interface, eth0); and

Values: [{"timestamp": 1234, "rxBytes": 456, "status": "UP", rxRate: 1.132}, {"timestamp": 1244, "rxBytes": 123, "status": "UP", rxRate: 0.342}, {"timestamp": 1254, "status": "DOWN"}, . . . ].

When such time series are programmatically consumed (especially in a streaming fashion) a program cannot make too many assumptions regarding the content of the time series. Rather, the program needs to employ flexible and dynamic structures (e.g., extensible lists, maps or dictionaries) to support the genericity while maintaining reasonable performance.

While these dynamic structures are generally fast to build and read, they tend to be memory inefficient, as they are typically trading off performance at the expense of memory usage. In addition, the dynamic structures need to support arbitrary data types. Thus, these dynamic structures often force programmers to use larger objects for the actual values (for example, a long object instead of a native long type in Java).

Efficient time series handling is an important factor when distinguishing complex (e.g., difficult to maintain) and/or expensive (e.g., in terms of resource usage) solutions from good solutions, especially in the context of analytics and artificial intelligence. For analytics and artificial intelligence applications, for example, it is often common to process a large amount of data. One or more aspects of the disclosure recognize that efficiently storing such data in memory (and/or long term storage, for example) can result in significant cost and performance benefits.

Figure 2:
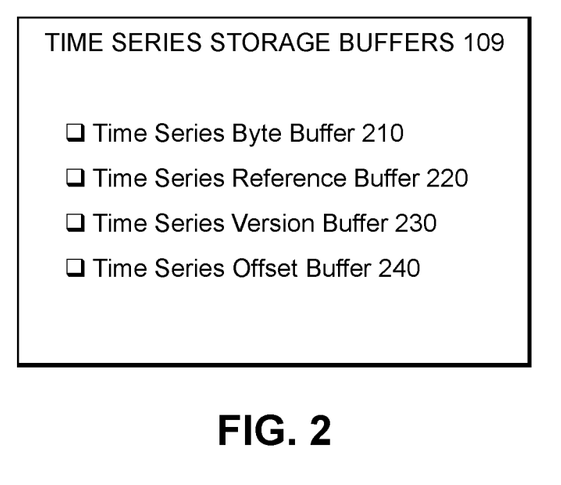
FIG. 2 illustrates the time series storage buffers of FIG. 1 in further detail, according to one embodiment of the disclosure.

FIG. 2 illustrates the time series storage buffers 109 of FIG. 1 in further detail, according to one embodiment of the disclosure. As shown in FIG. 2, the exemplary time series storage buffers 109 comprise a time series byte buffer 210, a time series reference buffer 220, a time series version buffer 230 and a time series offset buffer 240.

Figure 4:
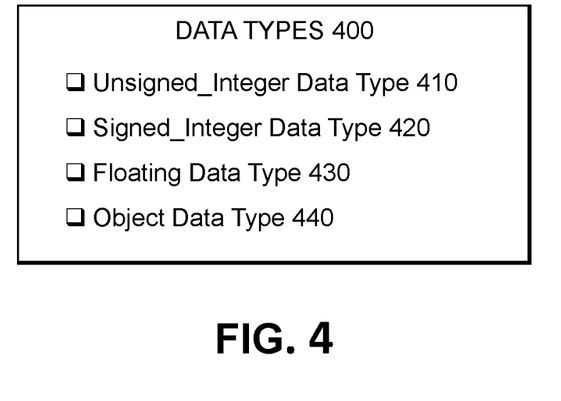
FIG. 4 illustrates a number of exemplary data types for a dynamic schema, according to at least one embodiment of the disclosure.

As discussed further below in conjunction with FIG. 4, the exemplary time series byte buffer 210 stores values for unsigned_integer, signed_integer, and floating data types, as well as an index (e.g., offset position) for values of the object data type, as discussed herein. The exemplary time series reference buffer 220 stores catch-all Object values. The exemplary data types are discussed hereinafter in the section entitled "Dynamic Schema."

The exemplary time series version buffer 230 stores the schema version of each data point (e.g., to properly retrieve and decode each data point). The exemplary time series offset buffer 240 stores the beginning of each data point in the time series byte buffer 210.

Figure 3:
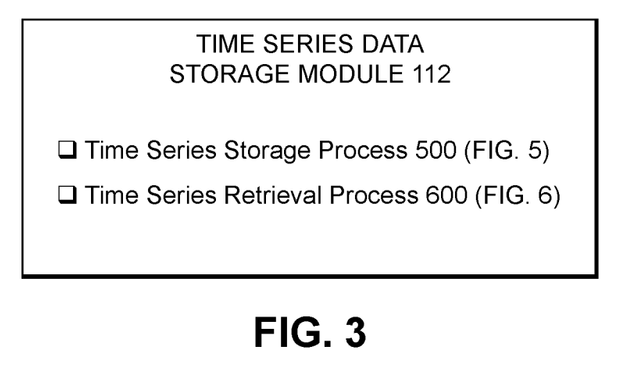
FIG. 3 illustrates the time series data storage module of FIG. 1 in further detail, according to some embodiments.

FIG. 3 illustrates the time series data storage module 112 of FIG. 1 in further detail, according to some embodiments. As shown in FIG. 3, the exemplary time series data storage module 112 comprises a time series storage process 500, as discussed further below in conjunction with FIG. 5, and a time series retrieval process 600, as discussed further below in conjunction with FIG. 6.

Dynamic Schema

A schema associates a data type to keys of key-value pairs. FIG. 4 illustrates a number of exemplary data types 400 for a dynamic schema, according to at least one embodiment of the disclosure. The disclosed exemplary data types 400 for a dynamic schema, in one or more embodiments, define multiple data types that maintain a balance between non-complexity (e.g., a low number of data types), speed and compactness (e.g., provide data types that provide more opportunities to optimize storage of data items). In one or more embodiments, the supported data types comprise: an unsigned_integer data type 410, a signed_integer data type 420, a floating data type 430 and a catch-all object data type 440. Generally, as discussed herein, the exemplary catch-all object data type 440 is compatible with the value of any key-value pair and therefore new data types do not need to be added.

In some embodiments, the disclosed structure comprises multiple versions of a dynamically built schema, with the first version (e.g., when the structure is empty) being an empty schema.

Storing Time Series Data

Figure 5:
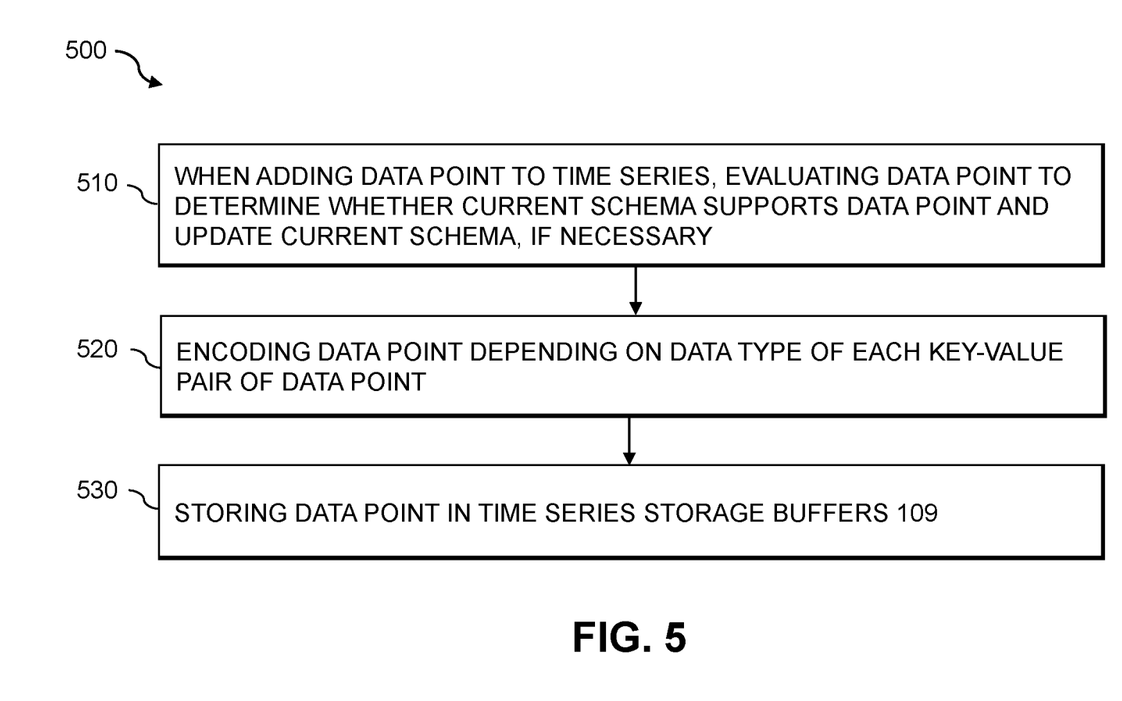
FIG. 5 is a flow chart illustrating an exemplary implementation of a time series storage process, according to one embodiment of the disclosure.

FIG. 5 is a flow chart illustrating an exemplary implementation of a time series storage process 500, according to one embodiment of the disclosure. As shown in FIG. 5, when adding a new data point to a time series, the exemplary time series storage process 500 evaluates the data point during step 510 to determine whether the data types 400 for the current dynamic schema support the new data point and to update the data types 400 for the current dynamic schema, if necessary. For example, when adding a data point to a time series, the time series storage process 500 can evaluate the new data point to determine whether the data point is compatible with the current schema. In at least some embodiments, incompatibility is determined by the following factors:

(a) whether the data point contains a key-value pair for which the key is currently not associated with a data type 400 in the current dynamic schema; and (b) whether the data point contains a key-value pair comprising a key for which the corresponding data type in the current dynamic schema is incompatible with the value of the respective key-value pair.

In the event that factor (a) is violated, a new schema version is created (e.g., by adding the respective key of the given key-value pair of the new data point and the corresponding data type in some embodiments).

In the case that factor (b) is violated, it is noted that the supported schema types may be overlapping (e.g., with the object data type 440 overlapping the other types). A new dynamic schema version is created in some embodiments where the key of the given key-value pair is associated with the data type of the value of the given key-value pair. A value can be compatible with more than one type. For example, if a key is associated with the type signed_integer in the schema, a positive integer, while being an unsigned_integer remains compatible with the signed_integer data type 420 and therefore does not require a schema update (being a catch-all type, the object data type 440 is always compatible with any type and therefore, a key associated with the object data type will not result in a schema incompatibility). If after these considerations, some values remain incompatible, a new schema version is created where the keys of the new schema version are associated with their own data type.

It is noted that, in at least some embodiments, from one version to another, the disclosed schema is always growing (e.g., keys and corresponding data types are not removed). One motivation is that the schema can be stored incrementally (therefore, not repeating keys and corresponding data types that have been seen before). In addition, it is not unusual to see "missing data points," in the sense that some key-value pairs may be sporadically missing from some data points. It would be counter effective to create new schemas each time the data points miss and then reappear.

As shown in FIG. 5, during step 520, the exemplary time series storage process 500 encodes the new data point depending on a data type of each key-value pair of the new data point. One motivation for building a schema, as described above, is to be able to encode the data point in a more efficient way. In one or more embodiments, the disclosed exemplary structures employ the time series byte buffer 210 and the time series reference buffer 220 to store values. In at least some embodiments, the time series byte buffer 210 stores variable length encoded values. It is noted that this is not a property of the buffer regarding whether or not to store variable length encoded values. The time series byte buffer 210 is a general-purpose byte buffer (to store bytes), in at least some embodiments, and variable length encoders make it such that a numeric value can be stored using a variable number of bytes (depending on the size of that numerical value).

As noted above, the time series byte buffer 210 stores values of an unsigned_integer data type 410, a signed_integer data type 420, a floating data type 430 and an index for values of an object data type 440, as discussed herein. In addition, the exemplary time series reference buffer 220 stores generic values of the object data type 440.

In at least one embodiment, various encoding techniques are applied during step 520, depending on a data type of each key-value pair of the new data point. For example, unsigned_integer values are applied to a variable length encoder and are appended to the time series byte buffer 210. Signed_integer values are handled in a similar manner, but in some embodiments, to improve the efficiency of the variable length encoding, a signed_integer value is first zigzag encoded to improve a likelihood of leading 0 bits.

A floating data type is encoded by encoding a value of a given key-value pair of the new data point into one or more long values (e.g., using an IEEE 754 encoding technique), applying the one or more long values to the variable length encoder and appending the encoded one or more long values to the time series byte buffer 210.

An object data type is encoded by appending a value of a given key-value pair of the new data point to a time series reference buffer 220 that stores generic values of the object data type and applying an index of the new data point in the second buffer to the variable length encoder and appending the encoded index of the new data point in the time series reference buffer 220 to the time series byte buffer 210.

As noted above, because the disclosed schema is growing, in some embodiments, "missing" values may also need to be encoded. Regardless of the schema type, "missing" values are encoded in some embodiments using a special one-byte marker (e.g., a predefined eight-bit value) that is non-ambiguous with any variable length encoded value.

Finally, during step 530, the exemplary time series storage process 500 stores the new data point in the time series storage buffers 109, in the manner described above.

Data Retrieval

Figure 6:
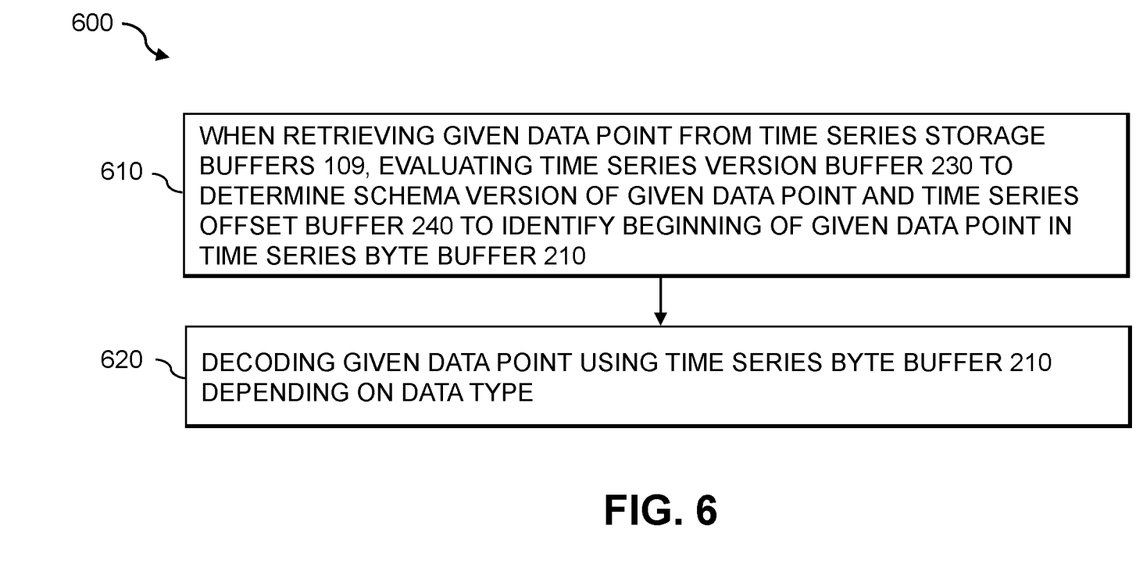
FIG. 6 is a flow chart illustrating an exemplary implementation of a time series retrieval process, according to at least one embodiment.

FIG. 6 is a flow chart illustrating an exemplary implementation of a time series retrieval process 600, according to at least one embodiment. As shown in FIG. 6, when retrieving a given data point from the time series storage buffers 109, during step 610, the exemplary time series retrieval process 600 evaluates the time series version buffer 230 to determine a schema version of the given data point and the time series offset buffer 240 to identify a beginning of the given data point in the time series byte buffer 210.

During step 620, the exemplary time series retrieval process 600 then decodes the given data point from the time series byte buffer 210, starting at the identified beginning of the given data point, depending on a data type of the respective key of the given data point in the current dynamic schema.

Figure 7:
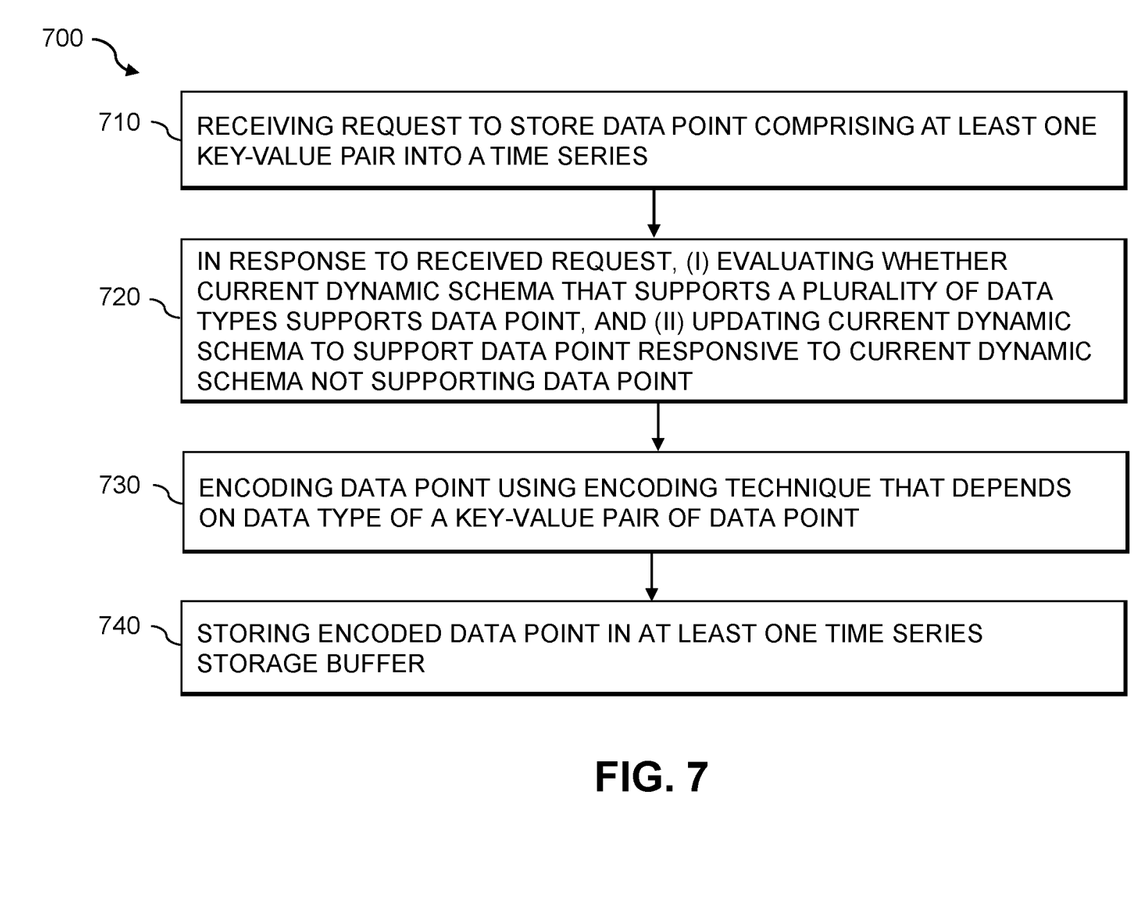
FIG. 7 is a flow chart illustrating an exemplary implementation of a time series storage process, according to some embodiments of the disclosure.

FIG. 7 is a flow chart illustrating an exemplary implementation of a time series storage process 700, according to some embodiments of the disclosure. As shown in FIG. 7, the exemplary time series storage process 700 initially receives a request during step 710 to store a data point comprising at least one key-value pair into a time series. Then, during step 720, in response to the received request, the exemplary time series storage process 700 (i) evaluates whether a current dynamic schema that supports a plurality of data types supports the data point, and (ii) updates the current dynamic schema to support the data point when the current dynamic schema does not support the data point.

In the example of FIG. 7, the time series storage process 700 then encodes the data point during step 730 using an encoding technique that depends on the data type of at least one key-value pair of the data point and stores the encoded data point in at least one time series storage buffer during step 740.

In other embodiments, the time series storage process 500, the time series retrieval process 600 and/or the time series storage process 700 can perform the sequence of actions in a different order. In yet another embodiment, these processes 500, 600, 700 can skip one or more of the actions. In other aspects, one or more of the actions are performed simultaneously. In some aspects, additional actions can be performed. Thus, the particular processing operations and other network functionality described in conjunction with the flow diagrams of FIGS. 5 through 7 are presented by way of illustrative example only, and should not be construed as limiting the scope of the disclosure in any way.

In some embodiments, the encoded data points in the time series byte buffer 210 and time series reference buffer 220 can be iterated over (e.g., sequential access) but also accessed in a random manner (e.g., random access) using the time series version buffer 230 and the time series offset buffer 240. In such embodiments, the time series version buffer 230 and time series offset buffer 240 are not variable length nor run-length encoded. In this manner, to access the $n^{th}$ data point of the time series, the $n^{th}$ value is obtained from the time series version buffer 230 and the time series offset buffer 240 and the data point is decoded.

Once the desired data point data is located in the time series byte buffer 210, for example, the conversions from the encoding aspects of the time series storage process 500 of FIG. 5 can be reversed to restore the inserted values.

Among other benefits, the use of the disclosed buffers enables a simple structure that is a trade-off between performance and memory use. Typical (e.g., conventional) buffers are represented by a fixed length buffer that is copied into a larger buffer when the fixed length buffer gets full. To maintain consistent performance, the larger buffer would typically grow by a percentage of its previous size. One or more aspects of the disclosure recognize that the larger those buffers grow, however, the more memory that is wasted.

In addition, the disclosed storage techniques store generic time series in a more memory efficient structure while preserving one or more characteristics, such as one or more of the following exemplary characteristics:
- comparably fast to build and read;
- one or more orders of magnitude reduction in memory (e.g., by at least a factor of ten);
- no assumptions regarding the time series properties;
- can be created from a streaming input;
- no extra memory required while being created; and
- can be consumed sequentially or in a random access manner.

In at least some embodiments, the disclosed buffer implementations instead use a chunk list where data is appended to fixed length chunks. When a chunk is full, a new chunk is added and written into (e.g., thereby ensuring the most memory that is wasted is the size of a chunk, regardless of the size the buffer itself).

In some embodiments, various techniques can be applied to reduce the impact of index arithmetic when reading or writing values. For example, when reading and/or writing a variable length encoded integer of up to 10 bytes from or into the buffer, respectively, the variable length encoded integers can be retrieved or written, respectively, as fast as from or to, respectively, a native array as long as the offset is not less than 10 bytes away from the end of the chunk.

One or more embodiments of the disclosure provide improved methods, apparatus and computer program products for storing generic time series data using a dynamic schema. The foregoing applications and associated embodiments should be considered as illustrative only, and numerous other embodiments can be configured using the techniques disclosed herein, in a wide variety of different applications.

It should also be understood that the disclosed time series storage techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for storing generic time series data using a dynamic schema may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based time series storage engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based time series storage platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
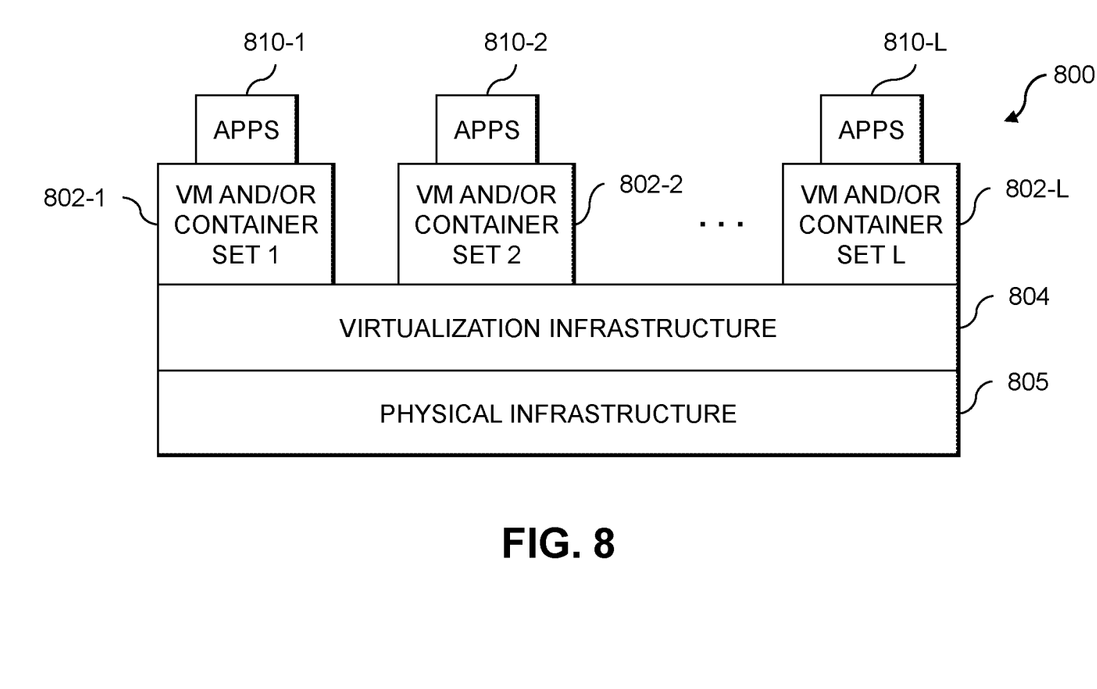
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide time series storage functionality of the type described above for one or more processes running on a given one of the VMs. For example, each of the VMs can implement time series storage control logic and associated time series retrieval functionality for storing generic time series data using a dynamic schema for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter®. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide time series storage functionality of the type described above for one or more processes running on different ones of the containers. For example, a container host device supporting multiple containers of one or more container sets can implement one or more instances of time series storage control logic and associated time series retrieval functionality for use in storing generic time series data using a dynamic schema.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
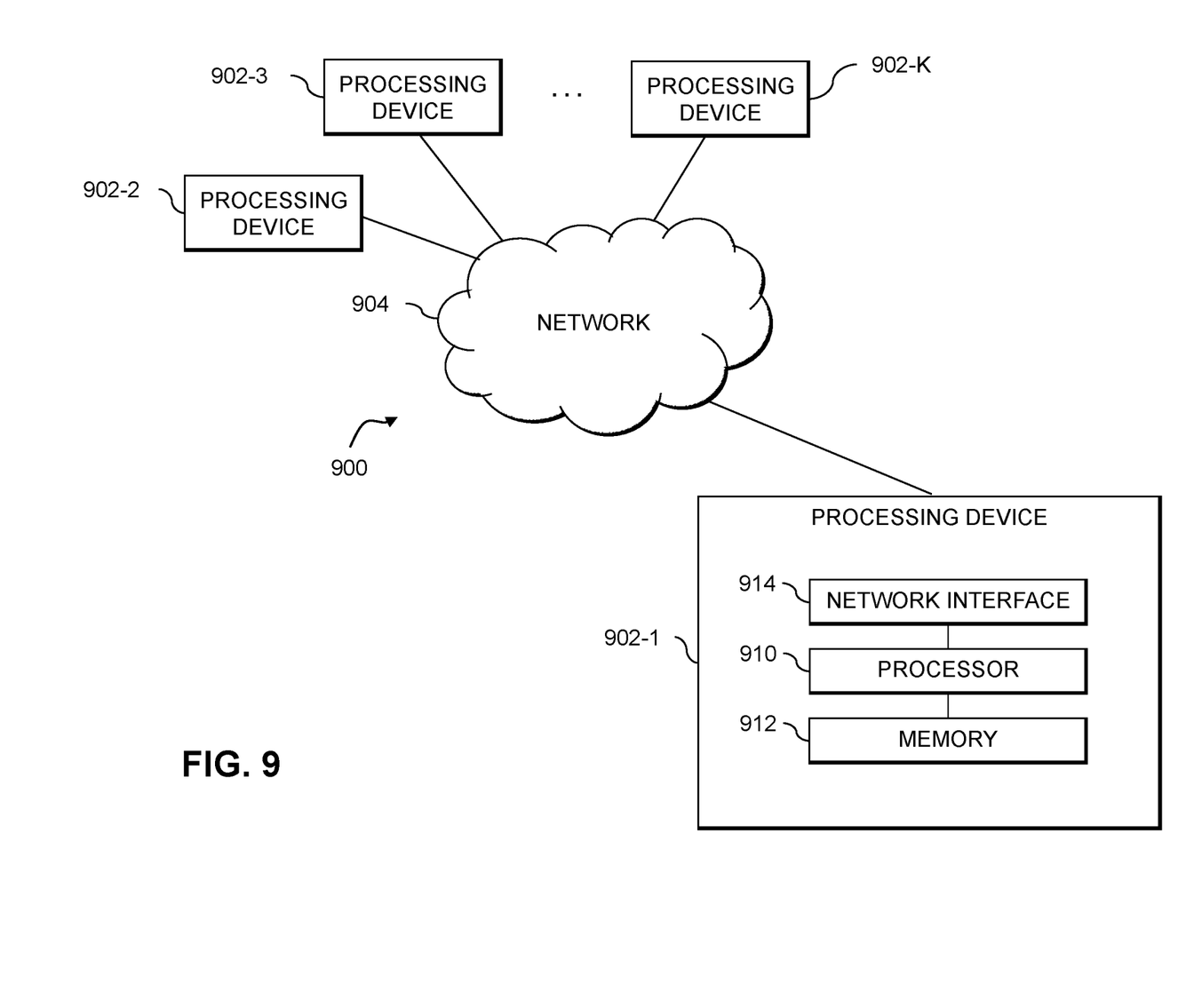
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving a request to store a data point into a time series, wherein the data point comprises at least one key-value pair;
in response to the received request, (i) evaluating whether a current dynamic schema supports the data point by one or more of: (a) determining whether the at least one key-value pair of the data point comprises a key not having a corresponding data type in the current dynamic schema and (b) determining whether the at least one key-value pair of the data point comprises a key for which the corresponding data type in the current dynamic schema is incompatible with the value of the respective key-value pair, and (ii) updating the current dynamic schema to support the data point responsive to the current dynamic schema not supporting the data point, wherein the current dynamic schema supports a plurality of data types;
encoding the data point using an encoding technique that depends on the data type of at least one key-value pair of the data point; and
storing the encoded data point in at least one time series storage buffer,
wherein the method is performed by at least one processing device comprising a processor coupled to a memory.

2. The method of claim 1, wherein, responsive to a given key-value pair of the data point comprising the key not having the corresponding data type in the current dynamic schema, the updating the current dynamic schema comprises creating a new dynamic schema version that adds the respective key of the given key-value pair of the data point and the corresponding data type.

3. The method of claim 1, wherein, responsive to a given key-value pair of the data point comprising the key for which the corresponding data type in the current dynamic schema is incompatible with the value of the given key-value pair, the updating the current dynamic schema comprises creating a new dynamic schema version where the key of the given key-value pair is associated with the data type of the value of the given key-value pair.

4. The method of claim 1, wherein the at least one time series storage buffer comprises one or more of a first buffer that stores encoded data point values for multiple data types, a second buffer that stores generic values of an object data type, a third buffer that stores a version of the current dynamic schema for each encoded data point, and a fourth buffer that stores an offset position of a beginning of each encoded data point in the first buffer.

5. The method of claim 4, wherein the encoding comprises: (a) for each key of the current dynamic schema, storing a corresponding value from the data point in one of the first and second buffers, based on the data type of the corresponding key in the current dynamic schema; (b) storing a schema version of the current dynamic schema in the third buffer; and (c) storing an offset position of the beginning of the encoded data point in the fourth buffer.

6. The method of claim 4, further comprising decoding the encoded data point by (a) determining the version of the dynamic schema for the encoded data point by accessing the third buffer; (b) identifying a beginning of the encoded data in the first buffer by accessing the fourth buffer; (c) obtaining the encoded data point from the first buffer using the identified beginning; and (d) for each key of the current dynamic schema, decoding a corresponding value from the encoded data point from one of the first and second buffers based on the data type of the corresponding key in the current dynamic schema.

7. The method of claim 1, wherein the plurality of data types comprises an unsigned_integer data type, a signed integer data type, a floating data type and an object data type.

8. The method of claim 7, wherein one or more of: (a) the encoding for the unsigned integer data type comprises applying a value of a given key-value pair of the data point to a variable length encoder and appending the encoded value of the given key-value pair of the data point to a first buffer that stores encoded data point values for multiple data types; (b) the encoding for the signed integer data type comprises applying a value of a given key-value pair of the data point to a zigzag encoder and applying an output of the zigzag encoder to the variable length encoder and appending the encoded value of the given key-value pair of the data point to the first buffer; (c) the encoding for the floating data type comprises encoding a value of a given key-value pair of the data point into one or more long values, applying the one or more long values to the variable length encoder and appending the encoded one or more long values to the first buffer; and (d) the encoding for the object data type comprises appending a value of a given key-value pair of the data point to a second buffer that stores generic values of the object data type and applying an index of the data point in the second buffer to the variable length encoder and appending the encoded index of the data point in the second buffer to the first buffer.

9. The method of claim 7, wherein the object data type is compatible with substantially all values of any key-value pair.

10. An apparatus comprising:
at least one processing device comprising a processor coupled to a memory;
the at least one processing device being configured to implement the following steps:
receiving a request to store a data point into a time series, wherein the data point comprises at least one key-value pair;
in response to the received request, (i) evaluating whether a current dynamic schema supports the data point by one or more of: (a) determining whether the at least one key-value pair of the data point comprises a key not having a corresponding data type in the current dynamic schema and (b) determining whether the at least one key-value pair of the data point comprises a key for which the corresponding data type in the current dynamic schema is incompatible with the value of the respective key-value pair, and (ii) updating the current dynamic schema to support the data point responsive to the current dynamic schema not supporting the data point, wherein the current dynamic schema supports a plurality of data types;
encoding the data point using an encoding technique that depends on the data type of at least one key-value pair of the data point; and
storing the data point in at least one time series storage buffer.

11. The apparatus of claim 10, wherein (i) responsive to a given key-value pair of the data point comprising the key not having the corresponding data type in the current dynamic schema, the updating the current dynamic schema comprises creating a new dynamic schema version that adds the respective key of the given key-value pair of the data point and the corresponding data type; and (ii) responsive to a given key-value pair of the data point comprising the key for which the corresponding data type in the current dynamic schema is incompatible with the value of the given key-value pair, the updating the current dynamic schema comprises creating a new dynamic schema version where the key of the given key-value pair is associated with the data type of the value of the given key-value pair.

12. The apparatus of claim 10, wherein the at least one time series storage buffer comprises one or more of a first buffer that stores encoded data point values for multiple data types, a second buffer that stores generic values of an object data type, a third buffer that stores a version of the current dynamic schema for each encoded data point, and a fourth buffer that stores an offset position of a beginning of each encoded data point in the first buffer.

13. The apparatus of claim 12, wherein the encoding comprises: (a) for each key of the current dynamic schema, storing a corresponding value from the data point in one of the first and second buffers, based on the data type of the corresponding key in the current dynamic schema; (b) storing a schema version of the current dynamic schema in the third buffer; and (c) storing an offset position of the beginning of the encoded data point in the fourth buffer.

14. The apparatus of claim 12, further comprising decoding the encoded data point by (a) determining the version of the dynamic schema for the encoded data point by accessing the third buffer; (b) identifying a beginning of the encoded data in the first buffer by accessing the fourth buffer; (c) obtaining the encoded data point from the first buffer using the identified beginning; and (d) for each key of the current dynamic schema, decoding a corresponding value from the encoded data point from one of the first and second buffers based on the data type of the corresponding key in the current dynamic schema.

15. The apparatus of claim 10, wherein the plurality of data types comprises an unsigned integer data type, a signed integer data type, a floating data type and an object data type.

16. The apparatus of claim 15, wherein one or more of: (a) the encoding for the unsigned integer data type comprises applying a value of a given key-value pair of the data point to a variable length encoder and appending the encoded value of the given key-value pair of the data point to a first buffer that stores encoded data point values for multiple data types; (b) the encoding for the signed integer data type comprises applying a value of a given key-value pair of the data point to a zigzag encoder and applying an output of the zigzag encoder to the variable length encoder and appending the encoded value of the given key-value pair of the data point to the first buffer; (c) the encoding for the floating data type comprises encoding a value of a given key-value pair of the data point into one or more long values, applying the one or more long values to the variable length encoder and appending the encoded one or more long values to the first buffer; and (d) the encoding for the object data type comprises appending a value of a given key-value pair of the data point to a second buffer that stores generic values of the object data type and applying an index of the data point in the second buffer to the variable length encoder and appending the encoded index of the data point in the second buffer to the first buffer.

17. A non-transitory processor-readable storage medium having stored therein program code of one or more software programs, wherein the program code when executed by at least one processing device causes the at least one processing device to perform the following steps:
receiving a request to store a data point into a time series, wherein the data point comprises at least one key-value pair;
in response to the received request, (i) evaluating whether a current dynamic schema supports the data point by one or more of: (a) determining whether the at least one key-value pair of the data point comprises a key not having a corresponding data type in the current dynamic schema and (b) determining whether the at least one key-value pair of the data point comprises a key for which the corresponding data type in the current dynamic schema is incompatible with the value of the respective key-value pair, and (ii) updating the current dynamic schema to support the data point responsive to the current dynamic schema not supporting the data point, wherein the current dynamic schema supports a plurality of data types;
encoding the data point using an encoding technique that depends on the data type of at least one key-value pair of the data point; and
storing the data point in at least one time series storage buffer.

18. The non-transitory processor-readable storage medium of claim 17, wherein the at least one time series storage buffer comprises one or more of a first buffer that stores encoded data point values for multiple data types, a second buffer that stores generic values of an object data type, a third buffer that stores a version of the current dynamic schema for each encoded data point, and a fourth buffer that stores an offset position of a beginning of each encoded data point in the first buffer.

19. The non-transitory processor-readable storage medium of claim 18, further comprising decoding the encoded data point by (a) determining the version of the dynamic schema for the encoded data point by accessing the third buffer; (b) identifying a beginning of the encoded data in the first buffer by accessing the fourth buffer; (c) obtaining the encoded data point from the first buffer using the identified beginning; and (d) for each key of the current dynamic schema, decoding a corresponding value from the encoded data point from one of the first and second buffers based on the data type of the corresponding key in the current dynamic schema.

20. The non-transitory processor-readable storage medium of claim 17, wherein the plurality of data types comprises an unsigned integer data type, a signed integer data type, a floating data type and an object data type.

* * * * *

UNITED STATES PATENT AND TRADEMARK OFFICE
CERTIFICATE OF CORRECTION

Page 1 of 1

PATENT NO. : 11,163,782 B2
APPLICATION NO. : 16/813911
DATED : November 2, 2021
INVENTOR(S) : Dominique Prunier It is certified that error appears in the above-identified patent and that said Letters Patent is hereby corrected as shown below:

In the Claims

Column 16, Line 43, in Claim 7, replace "types comprises an unsigned_integer data type, a signed" with -- types comprises an unsigned integer data type, a signed --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*